Oct. 29, 1940.     J. F. SKOLD     2,219,754
LIPSTICK SPREADER
Filed April 18, 1940

Inventor:
John F. Skold
By Fred Gerlach
Atty

Patented Oct. 29, 1940

2,219,754

UNITED STATES PATENT OFFICE 2,219,754

LIPSTICK SPREADER

John F. Skold, Chicago, Ill., assignor to Charles E. Zimmerman, Chicago, Ill.

Application April 18, 1940, Serial No. 330,270

7 Claims. (Cl. 91—67.4)

The present invention relates to spreaders for lipstick and other cosmetics and one object thereof is to provide a spreader which is an improvement upon, and has certain advantages over, previously devised lipstick spreaders.

Another object of the invention is to provide a lipstick spreader comprising an elongated tubular container which is adapted to hold a series of lipstick spreading wads of porous latex rubber or like material and has one end thereof open and equipped with a narrow cross piece and has at its other end a removable cap with a spring pressed plunger for urging the wads in the direction of the cross piece and causing the wad at the open end to project around and beyond the cross piece and become operative for lipstick spreading purposes and also causing the series of wads to advance toward the cross piece upon removal of the end wad after use of the latter.

Another object of the invention is to provide a lipstick spreader of the aforementioned type and character in which the container is provided with a removable cover for protecting the wad around the cross piece when the spreader is not in use.

A further object of the invention is to provide a lipstick spreader of the type and character under consideration in which the removable plunger equipped cap is shaped to form a retainer for a lipstick container.

A still further object of the invention is to provide a lipstick spreader which may be manufactured at a low and reasonable cost and effectively and efficiently fulfills its intended purpose.

Other objects of the invention and the various advantages and characteristics of the present lipstick spreader will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like numerals of reference denote corresponding parts throughout the several views.

Figure 3:
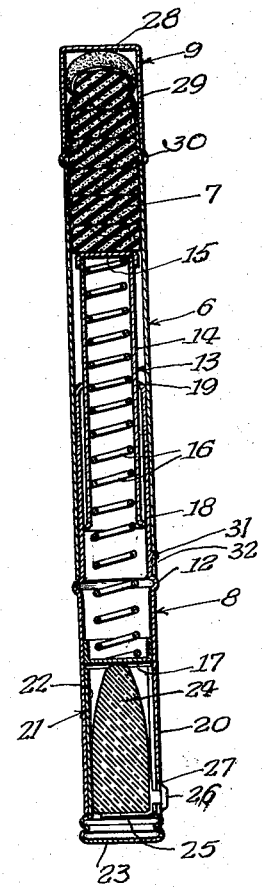
Figure 3 is a longitudinal section of the spreader.
Figure 4:
Figure 4 is a perspective of one of the lipstick spreading wads of porous latex rubber.
Figure 5:
Figure 5 is a longitudinal sectional view of the wad of Figure 4.

The spreader which is shown in the drawing constitutes the preferred embodiment of the invention. It is primarily designed to spread lipstick and other cosmetics and comprises as its parts an elongated tubular container 6, a series of lipstick spreading wads 7, a cap 8 and a cover 9. The container 6 is cylindrical, as shown in the drawing, and is preferably formed of metal. One end of the container is normally closed by the cap 8 and the other end of the container is dome shaped and has a circular opening 10. The latter is of slightly less diameter than the main portion of the interior of the container and is bridged by a narrow metallic cross piece 11. This cross piece is arcuate and has its ends fixedly secured to diametrically opposite portions of the hole defining part of the dome shaped end of the container. It projects a comparatively small distance beyond or outwardly of the circular opening 10, as shown in Figure 3, and constitutes an abutment or stop shoulder. The wads 7 are mounted in the container 6 and are formed of soft compressible material, such for example, as porous latex rubber. They are cylindrical, as shown in Figure 4, and have substantially the same diameter as the container interior.

The cap 8 is in the form of an elongated metallic tube and has one end thereof shaped to fit snugly within the container 6, as shown in Figure 3. An annular outstruck bead 12 on the central portion of the cap 8 serves to limit inward sliding movement of the cap with respect to the container 6. The cap carries a plunger 13 for urging the wads 7 in the direction of the cross piece 11. This plunger comprises a cylindrical side wall 14 and a circular end wall 15 and is slidably mounted within the end of the cap which is shaped to fit within the container 6. The end wall 15 extends across, and is formed integrally with, the outer end of the side wall 14 and is adapted to abut directly against the wad which is farthest from the cross piece 11. The plunger is urged in the direction of the cross piece by means of a compression spring 16. One end of the spring fits within the side wall 14 of the plunger and abuts against the end wall 15.

Figure 2:
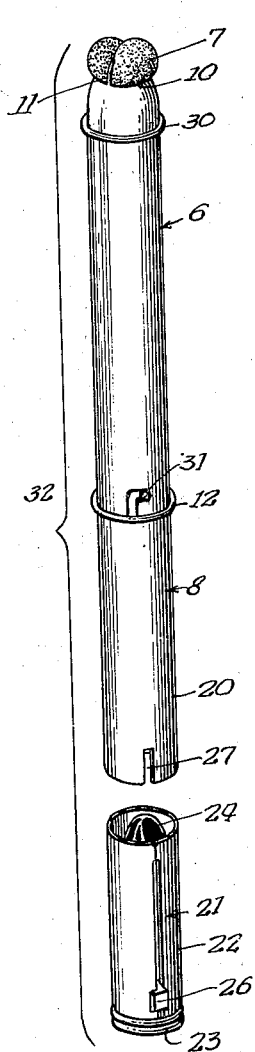
Figure 2 is a perspective view illustrating the container without the cover which serves to protect the operative lipstick spreading wad around the cross piece and showing the lipstick container removed from the plunger equipped cap.

The other end of the spring is seated against a cross wall 17 in the central portion of the cap 8. The plunger is of such length that when the cap is in place it is capable of moving to the dome shaped end of the container 6. The inner end of the side wall 14 of the plunger has an out-turned flange 18 and this flange coacts with an in-turned flange 19 on the inner end of the cap to limit outward movement of the plunger relatively to the cap. The plunger compresses the wads 7 and, as heretofore pointed out, urges them toward the cross piece 11. It causes the wad 7 in the dome shaped end of the container to move outwards around the cross piece 11, as shown in Figure 2. Such wad, because of the compression or force to which it is subjected by the plunger, moves outwards around the cross piece 11 and is retained by such cross piece in an operative position wherein it is useable for lipstick spreading purposes. The side portions of the outermost wad extend around the cross piece and together form an efficient lipstick spreading medium. When the outermost wad becomes soiled it is removed by pulling it away from the cross piece 11. Upon removal of the outermost wad the plunger 13 urges the series of wads upwards and forces the next wad against the cross piece 11. As long as the container 6 is charged the plunger 13 automatically maintains one wad in a lipstick spreading position under the cross piece 11. To fill the container 6 it is only necessary to remove the cap 8. Upon removal of the cap from the container additional wads may be inserted into the container interior and when the cap is inserted back into place the plunger 13 compresses the wads and renders the spreader as a whole operative. The cross wall 17 of the cap is welded or otherwise fixedly secured in place and defines with the outer end of the cap a cylindrical open ended retainer 20 for a lipstick container 21. The container consists of a cylindrical side wall 22 and an end wall 23 and has a lipstick piece 24 movably mounted within it. The side wall of the lipstick container is adapted to fit within the retainer 20, as shown in Figure 3. The lipstick piece 24 is movably mounted within the container 21 by way of a slide plate 25 having a finger piece 26 for manipulating purposes. The finger piece is exteriorly positioned with respect to the side wall 22 of the container 21 and fits within a notch 27 in the outer end of the cap 8 when the container 21 is in the open ended retainer 20.

Figure 1:
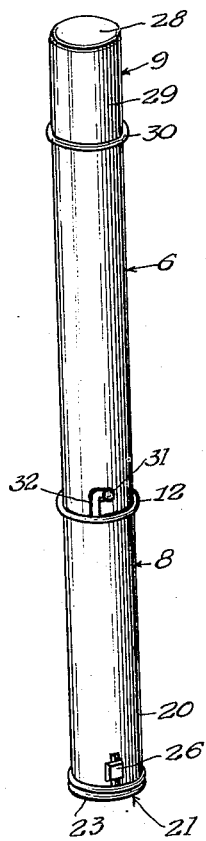
Figure 1 is a perspective view of a lipstick spreader embodying the invention.

The cover 9 serves to protect the outermost wad 7 when the spreader is not in use. It is cup shaped, as shown in Figures 1 and 3 and consists of a circular top 28 and a cylindrical skirt 29. The skirt is adapted to be slid onto the dome shaped end of the wad container 6 and it is of such internal diameter that it grips frictionally the dome shaped end of the container and thus remains in place. An annular out-struck bead 30 is formed on the container 6 immediately inwards of the opening 10 and serves to limit inward movement of the cover with respect to the container.

When it is desired to use the spreader it is only necessary to remove the cover 9. Upon removal of the cover from the container 6 the wad under the cross piece 11 is available for lipstick spreading purposes. The container 6 serves as a handle for the operative wad and permits such wad to be readily manipulated. It is contemplated that the user first remove the lipstick container and then apply lipstick. Thereafter the lipstick container is returned to the retainer 20 and the lipstick is spread by means of the outermost wad 7. To fill the container it is only necessary, as heretofore pointed out, to remove the cap 8 and insert a new supply of wads into the container interior. When the cap is in place the plunger operates automatically to feed the wads successively into their operative position. For the purpose of preventing ejection of the cap 8 from the container 6 due to the action of the spring 16 the inner end of the cap is provided with an outwardly extending stud 31. This stud is adapted to fit within and coacts with an L-slot 32 in the container 6. When the stud is in the inner end of the slot as shown in Figures 1 and 2 the cap is locked against axial displacement with respect to the container. In order to release the cap for removal from the container it is only necessary to rotate it until the stud registers with the outer part of the slot. When the cap is so rotated it may be removed from the container merely by pulling it therefrom.

The herein described lipstick spreader is simple in design and hence may be manufactured at a low and reasonable cost. It occupies but a comparatively small amount of room and hence may be readily carried by the user. By reason of the fact that the end of the container 6 having the cross-piece 11 is dome shaped the inner end of the outermost or operative wad 7 is confined within the container. The cross piece 11, as shown in Figure 3, projects beyond the opening 10 a distance approximately equal to half the length of each wad 7. Because of this the dome shaped end of the container effectively holds the operative wad against accidental displacement during use. Because the wads are cylindrical they slide readily in the container 6 in response to the action of the plunger 13.

The invention is not to be understood as restricted to the details set forth since these may be modified within the scope of the appended claims without departing from the spirit and scope of the invention.

Having thus described the invention what I claim as new and desire to secure by Letters Patent is:

1. A spreader of the character described comprising an elongated tubular container adapted to hold a series of compressible wads and having an opening at one end thereof with a narrow cross piece across said opening, and means located at the other end of the container for feeding the wads towards the cross piece and causing the outermost wad to project beyond the opening and assume an operative position wherein it is in straddled relation with the cross piece and is free for sidewise removal.

2. A spreader of the character described comprising an elongated tubular container adapted to hold a series of compressible wads and having an opening at one end thereof with a narrow arcuate cross piece extending across and projecting outwardly of said opening, and spring means in the other end of the container for feeding the wads towards the cross piece and causing the outermost wad to project beyond the opening and assume an operative position wherein it is in straddled relation with the cross piece and is free for sidewise removal.

3. A spreader of the character described comprising an elongated tubular container adapted to hold a series of compressible wads and having one end thereof dome shaped and provided with an opening of less width than the main portion of the container interior, and spring means in the other end of the container for feeding the wads towards the dome shaped other end and causing the outermost wad to project partially through the opening and assume an operative position wherein it is available for spreading purposes.

4. A spreader of the character described comprising an elongated cylindrical container adapted to hold a series of compressible wads and having one end thereof dome shaped and provided with a circular opening of less diameter than the main portion of the container interior, a curved narrow cross piece extending diametrically across, and projecting outwardly of said opening, and spring means in the other end of the container for feeding the wads towards the cross piece and causing the outermost wad to project beyond the opening and assume an operative position wherein it is in straddled relation with the cross piece and is free for sidewise removal.

5. A spreader of the character described comprising an elongated tubular container adapted to hold a series of compressible wads and having open ends together with a narrow cross piece extending across one end, and a cap removably secured to the other end of the container and having a spring actuated plunger operative when the cap is in place to feed the wads toward the cross piece and cause the outermost wad to assume an operative position wherein it is in straddled relation with the cross piece and is free for sidewise removal.

6. A spreader of the character described comprising an elongated tubular container having at one end thereof an opening with a stop shoulder, a series of compressible wads slidably mounted in the container, and means located at the other end of the container for feeding the wads toward said one end of the container and causing the outermost wad to project through the opening and partially past the stop shoulder.

7. A spreader of the character described comprising an elongated cylindrical container having at one end thereof an opening with a stop shoulder, a series of cylindrical porous latex rubber wads slidably mounted in the container, and spring means in the other end of the container for feeding the wads toward said one end of the container and causing the outermost wad to project through the opening and partially past the stop shoulder.

JOHN F. SKOLD.